US008888556B2

(12) United States Patent
Jackson et al.

(10) Patent No.: US 8,888,556 B2
(45) Date of Patent: Nov. 18, 2014

(54) BREAST SHAPING ADHESIVE AND METHODS FOR SHAPING BREASTS

(75) Inventors: Dawn E. Jackson, Los Angeles, CA (US); Mehrdad Jahedschoar, Corona, CA (US)

(73) Assignee: Dawn E. Jackson, Laguna Hills, CA (US)

( * ) Notice: Subject to any disclaimer, the term of this patent is extended or adjusted under 35 U.S.C. 154(b) by 102 days.

(21) Appl. No.: 13/474,592

(22) Filed: May 17, 2012

(65) Prior Publication Data

US 2012/0302136 A1 Nov. 29, 2012

Related U.S. Application Data

(60) Provisional application No. 61/486,905, filed on May 17, 2011.

(51) Int. Cl.
*A41C 3/06* (2006.01)
*C09J 133/02* (2006.01)
*C09J 133/08* (2006.01)
*C08K 5/05* (2006.01)

(52) U.S. Cl.
CPC ............... *A41C 3/065* (2013.01); *C09J 133/02* (2013.01); *C08K 5/05* (2013.01); *C09J 133/08* (2013.01); *A41B 2400/38* (2013.01)
USPC .................. 450/81; 450/37; 450/54

(58) Field of Classification Search
CPC ..... A41C 3/0021; A41C 3/0028; A41C 3/065
USPC .................... 450/81, 37, 38, 54–57
See application file for complete search history.

(56) References Cited

U.S. PATENT DOCUMENTS

| | | | | | |
|---|---|---|---|---|---|
| 5,755,611 | A | * | 5/1998 | Noble et al. ................... | 450/39 |
| 6,231,424 | B1 | * | 5/2001 | Valentin ........................ | 450/81 |
| 6,257,952 | B1 | * | 7/2001 | Valentin ........................ | 450/81 |
| 6,336,839 | B1 | * | 1/2002 | Valli ............................. | 450/1 |
| 6,383,055 | B2 | * | 5/2002 | Valentin ........................ | 450/81 |
| 6,419,548 | B1 | * | 7/2002 | Wittes et al. ................. | 450/57 |
| 6,666,747 | B1 | * | 12/2003 | Buntz ........................... | 450/81 |
| 6,758,720 | B2 | * | 7/2004 | Chen ............................. | 450/57 |
| 6,780,081 | B2 | * | 8/2004 | Chen et al. .................... | 450/81 |
| 6,814,648 | B2 | * | 11/2004 | Chong ........................... | 450/81 |
| 7,048,761 | B2 | * | 5/2006 | Ajili ............................. | 623/7 |
| 7,335,086 | B1 | * | 2/2008 | Karon ........................... | 450/81 |
| 7,399,216 | B2 | * | 7/2008 | Mateo ........................... | 450/81 |
| 7,473,158 | B2 | * | 1/2009 | Horton .......................... | 450/81 |
| 7,637,798 | B2 | * | 12/2009 | Lutzi ............................. | 450/81 |
| 7,806,749 | B2 | * | 10/2010 | Horton .......................... | 450/81 |
| 7,993,182 | B2 | * | 8/2011 | Horton et al. ................. | 450/81 |

(Continued)

*Primary Examiner* — Gloria Hale
(74) *Attorney, Agent, or Firm* — The Eclipse Group LLP

(57) ABSTRACT

A method is provided for shaping breast tissue via a liquid adhesive that may be applied to an article of clothing and/or a portion of a breast of a user. The liquid adhesive can be applied to a breast or clothing of a user. The breast may then be positioned within the clothing to maintain the desired appearance. A liquid adhesive is further provided that includes a mixture of a polymer and a solvent, where the mixture has a pH ranging from about 6 to about 8 and where the solvent comprises denatured alcohol and water and where the polymer is selected from the group consisting of: a methacrylate copolymer; a polyquaternium cationic polymer, a poly(acrylic acid) polymer; an acrylate copolymer; and combinations of two or more of the foregoing.

20 Claims, 5 Drawing Sheets

(56) References Cited

U.S. PATENT DOCUMENTS

| | | | |
|---|---|---|---|
| 8,075,370 B1* | 12/2011 | Hancock | 450/94 |
| 8,113,910 B2* | 2/2012 | Fortner | 450/81 |
| 2005/0042264 A1* | 2/2005 | Horton | 424/443 |
| 2007/0218805 A1* | 9/2007 | Mateo | 450/81 |
| 2007/0289047 A1* | 12/2007 | Fortner | 2/268 |
| 2009/0093190 A1* | 4/2009 | Wooley | 450/41 |
| 2009/0111357 A1* | 4/2009 | Horton | 450/81 |
| 2009/0117825 A1* | 5/2009 | Lutzi | 450/81 |
| 2009/0149114 A1* | 6/2009 | Horton et al. | 450/54 |

* cited by examiner

BREAST SHAPING ADHESIVE AND METHODS FOR SHAPING BREASTS

RELATED APPLICATIONS

This application claims priority of U.S. Provisional Application Ser. No. 61/486,905, filed on May 17, 2011, titled BREAST SHAPING ADHESIVE AND METHODS FOR SHAPING BREASTS, which application is incorporated in its entirety by reference in this application.

BACKGROUND OF THE INVENTION

Field of the Invention

The present invention relates generally to methods for enhancing one's appearance, and in particular, to methods for shaping breast tissue via a liquid adhesive that may be applied to an article of clothing and/or a portion of a breast of a user.

SUMMARY

A method is provided for shaping breast tissue via a liquid adhesive that may be applied to an article of clothing and/or a portion of a breast of a user. The method includes the steps of applying a liquid adhesive to a selected area of a breast of a user; and positioning the breast to achieve a desired appearance in a manner where at least a portion of the liquid adhesive is in contact with an article of clothing being worn by the user to maintain the desired appearance.

A method for shaping breast tissue is further provided that includes applying a liquid adhesive to an article of clothing and positioning at least a portion of a breast of a user within the article of clothing to achieve a desired appearance, where the applied liquid adhesive is in contact with the breast to maintain the desired appearance.

A liquid adhesive is further provided for use in connection with shaping one's breast, the liquid adhesive comprises a mixture of a polymer and a solvent, where the mixture has a pH ranging from about 6 to about 8 and where the polymer is selected from the group consisting of: a methacrylate copolymer; a polyquaternium cationic polymer; a poly(acrylic acid) polymer; an acrylate copolymer; and combinations of two or more of the foregoing and where the solvent comprises denatured alcohol and water.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figures 1A, 1B:
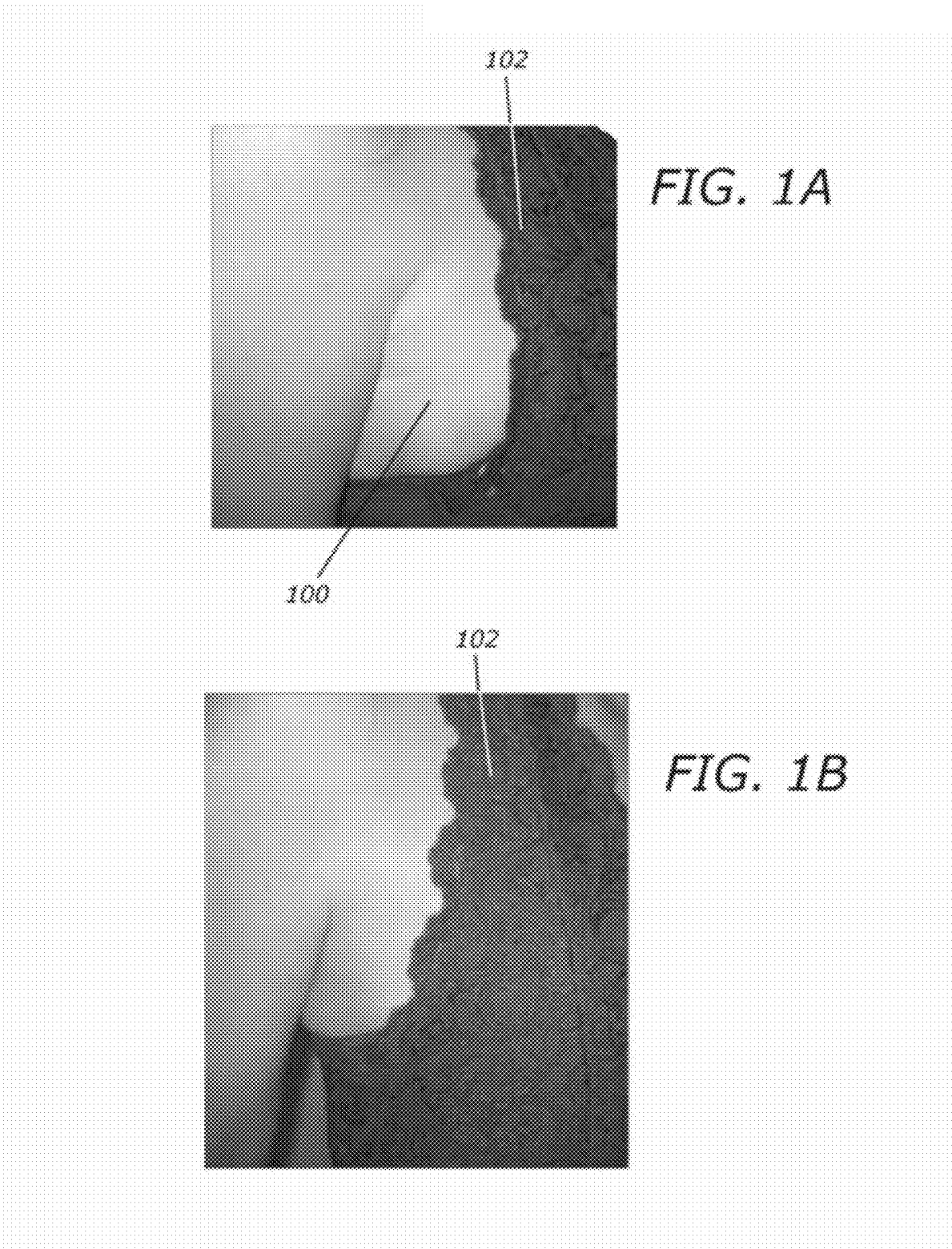
FIG. 1A is an image of an outer side area of a breast of a user that is not initially contained within an article of clothing.
FIG. 1B is an image showing at least a portion of the outer side area of the breast being contained within the article of clothing via the liquid adhesive.

As discussed below in conjunction with FIGS. 1A-3B, methods for shaping the breast tissue of a user via a liquid adhesive are provided herein. The liquid adhesive may be used to aesthetically enhance the appearance (i.e., to achieve a desired appearance) of the breast(s) of a user.

The term "liquid adhesive" is used herein to refer to any suitable adhesive, glue or epoxy resin that is provided in liquid form and may be applied to the breast tissue and/or clothing (e.g., bra) of a user for shaping at least one breast of the user and achieving a desired appearance. The liquid adhesive should be substantially neutral (e.g., having a pH ranging from about 6 to about 8) so as to be safe for contacting the skin of a user, and should meet all relevant FDA regulations. In some implementations, the liquid adhesive may be a hydroalcoholic system. The liquid adhesive may be washed from the skin of a user and/or the clothing of a user via soap and water. The liquid adhesive may be "water-activated," such that water alone will cause the liquid adhesive to rebond with the clothing and/or the skin tissue of the user. Once the liquid adhesive is applied to the breast tissue and/or clothing of the user, the adhesive may substantially dry within a time period ranging from less than a minute to one or two minutes, for example.

In some implementations, the liquid adhesive may include a polymer mixed with a denatured solvent. For example, the liquid adhesive may include a methacrylate copolymer resin (e.g., an ethyl ester of polyvinylmethyl ether maleic acid (PVM/MA) Gantrez™-type copolymer) in a solvent including alcohol (e.g., denatured ethanol) and water. Any suitable denaturing agent may be utilized to denature the alcohol in the hydroalcoholic liquid adhesive system, such as t-butyl alcohol, brucine sulfate, sucrose octaacetate, sodium salicylate, salicylic acid, and the like. The polymer may include an anionic polymer such as the methacrylate copolymer resin discussed above. Other suitable types of polymers that may be utilized in conjunction with the present invention include, but are not limited to: acrylic acid type polymers; acrylate copolymer type polymers; polyquaternium cationic polymers; and the like. The liquid adhesive may include, any suitable additive (e.g., one or more fragrances).

As shown in Table 1 below, the liquid adhesive may include a variety of ingredients, with varying percentages of ingredients by volume. In some implementations, the liquid adhesive may include denatured ethanol ranging from about 10 vol % to about 55 vol %. In some implementations, the liquid adhesive may include polymeric resin ranging from about 5 vol % to about 40 vol %. In some implementations, the liquid adhesive may include glycol (a precursor to polymeric resins) ranging from about 2 vol % to about 10 vol %. In some implementations, the liquid adhesive may include any suitable neutralizer ranging from about 0.1 vol % to about 3.0 vol %. In some implementations, the liquid adhesive may include water ranging from about 10 vol % to about 55 vol %. Those of skill in the art will appreciate that the compositional ranges shown in Table 1 are for illustrative purposes only, as the liquid adhesive utilized in conjunction with the present invention may include one or more of the ingredients shown in Table 1, in any suitable compositional amount.

TABLE 1

An example of compositional ranges of ingredients that may be present in the liquid adhesive of the present invention.

| Ingredients | Range (vol %) |
| --- | --- |
| Denatured Ethanol | 10-55% |
| Polymer Resin | 5-40% |
| Glycol | 2-10% |
| Neutralizer | 0.1-3.0% |
| Water | 10-55% |

The liquid adhesive of the present invention may be applied to the breast tissue and/or clothing (e.g., any suitable bra) of a user by any suitable means. For example, the liquid adhesive may be applied via a liquid adhesive-containing towlette or wipe. As another example, the liquid adhesive may be applied via a roll-on device, various implementations of which are known to those skilled in the art. Via application of the liquid adhesive to the breast tissue and/or the clothing of the user, the breasts of the user may be shaped to achieve a desired aesthetic appearance. For example, the user may apply the liquid adhesive to one breast (or both breasts) and/or an article of clothing, and may position the breast to achieve one or more of the following: lift, separation, reduction or elimination of décolleté lines or wrinkles, increased cleavage, reduced cleavage, stabilization (e.g., reduced bounce during walking or running, for example), or to secure the breast in an article of clothing such as a bra or low-cut dress.

FIG. 1A is an image of an outer side area 100 of a breast of a user that is not initially contained within an article of clothing 102. In order to conceal at least a portion of the outer side area 100 of the breast within the article of clothing 102, the liquid adhesive described herein may be applied to the outer side area 100 of the breast and/or an inner portion of the article of clothing 102. The user may then position at least a portion of the outer side area 102 of the breast within the article of clothing 102 so that the liquid adhesive forms a bond between the breast tissue of the outer side area 100 and the inner portion of the article of clothing 102 as the liquid adhesive dries. FIG. 1B is an image showing at least a portion of the outer side area 100 of the breast (that was initially outside of the article of clothing 102) being concealed within the article of clothing 102 via the applied liquid adhesive.

Figure 2A:
FIG. 2A is an image showing the upper area of the breast of a user that is not initially contained within a bra.
Figure 2B:
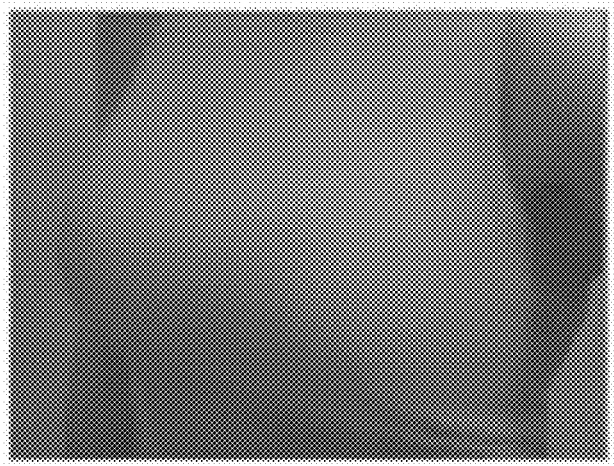
FIG. 2B is an image showing at least a portion of the upper area of the breast being contained within the bra via the liquid adhesive.

FIG. 2A is an image showing the upper area 200 of a breast of a user that is not initially contained within a bra (not shown, as the bra is concealed by the shirt of the user). As shown, the upper area 200 is shown as bulging out from the bra, thus creating an undesired appearance. In order to reduce the bulging of the upper area 200, the liquid adhesive described herein may be applied to the upper area 200 (i.e., underneath the shirt of the user) of the breast and/or an inner portion of the bra of the user. The user may then position at least a portion of the upper area 200 of the breast within the bra so that the liquid adhesive forms a bond between the breast tissue of the upper area 200 and the inner portion of the bra as the liquid adhesive dries. FIG. 2B is an image showing at least a portion of the upper area 200 of the breast (that was initially bulging from the top of the bra) being contained within the bra via the liquid adhesive.

Figure 3A:
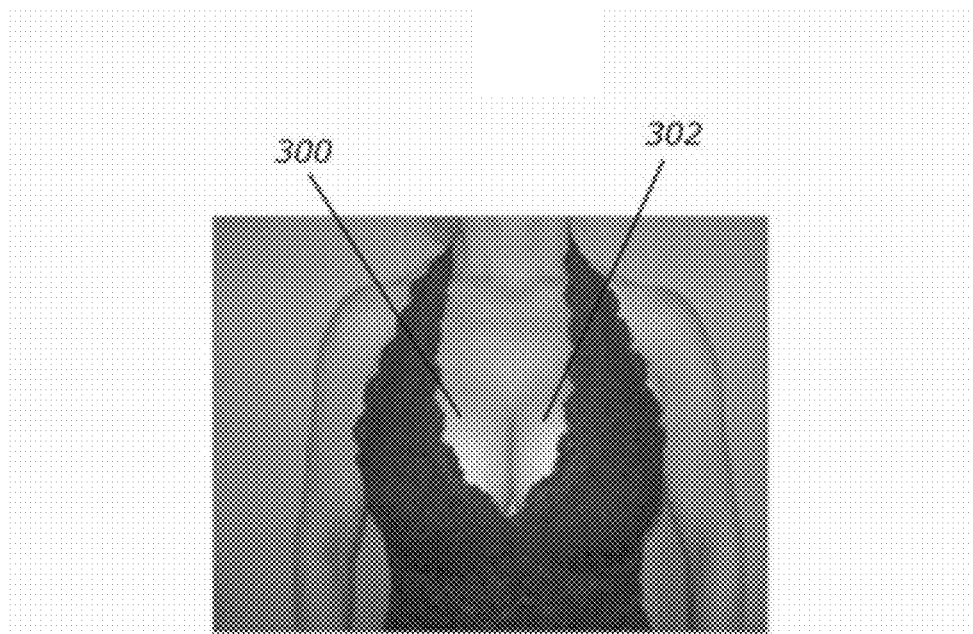
FIG. 3A is an image showing how a first breast of a user may be maintained in contact with a second breast of the user via the liquid adhesive.

FIG. 3A is an image showing how a first breast 300 of a user may be maintained in contact with a second breast 302 of the user via the liquid adhesive (e.g., to create the desired appearance of increased cleavage). For example, the liquid adhesive of the present invention may be applied to the outer side portion of each breast 300, 302 (and/or the inner portion of the article of clothing that is to come in contact with the outer side portion of each breast 300, 302). The user may position each breast 300, 302 to create the desired amount of cleavage. As the liquid adhesive dries, a bond may be formed between the article of clothing and the breasts 300, 302 such that the breasts are maintained in the desired position to produce the increased cleavage. Application of the liquid adhesive to produce increased cleavage is not limited to the foregoing. It will be understood that the liquid adhesive may be applied to any suitable location of the breasts 300, 302 and/or the article of clothing, and each breast 300, 302 may be positioned in any suitable manner so as to produce the desired effect (i.e., increased cleavage). For example, the liquid adhesive may be applied between the two breasts 300, 302 (e.g., on the inner side surface of the first breast 300 and/or the inner side surface of the second breast 302) and the user may position the breasts 300, 302 such that the liquid adhesive forms a bond between the two breasts 300, 302 as the liquid adhesive dries, thus maintaining contact between the breasts 300, 302.

Figure 3B:
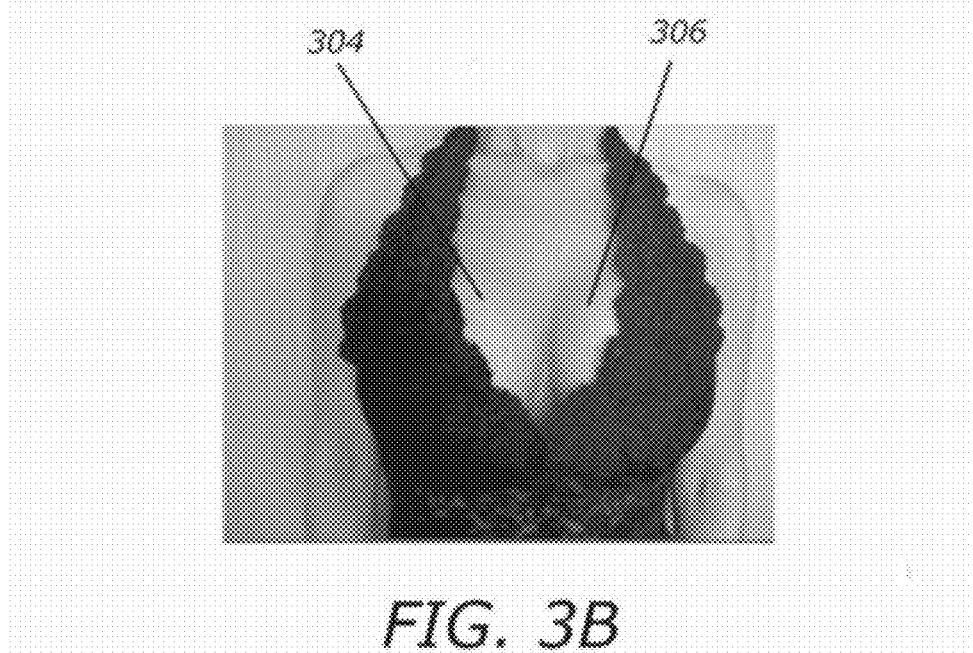
FIG. 3B is an image showing how a first breast of a user may be separated from a second breast of the user via the liquid adhesive.

FIG. 3B is an image showing how a first breast 304 of a user may be separated (e.g., to create the desired appearance of reduced cleavage) from a second breast 306 of the user via the liquid adhesive. For example, the liquid adhesive may be applied to a middle section of each of the two breasts 304, 306 and/or the respective inner portion of each breast 304, 306 and/or the appropriate inner portion of the article of clothing, and the user may position the breasts 304, 306 such that the liquid adhesive forms a bond between the article of clothing and the breasts 304, 306 as the liquid adhesive dries, thus maintaining separation between the breasts 304, 306. As described above in conjunction with FIG. 3A, the liquid adhesive may be applied in any suitable location to produce the desired appearance (i.e., decreased cleavage).

Figure 4A:
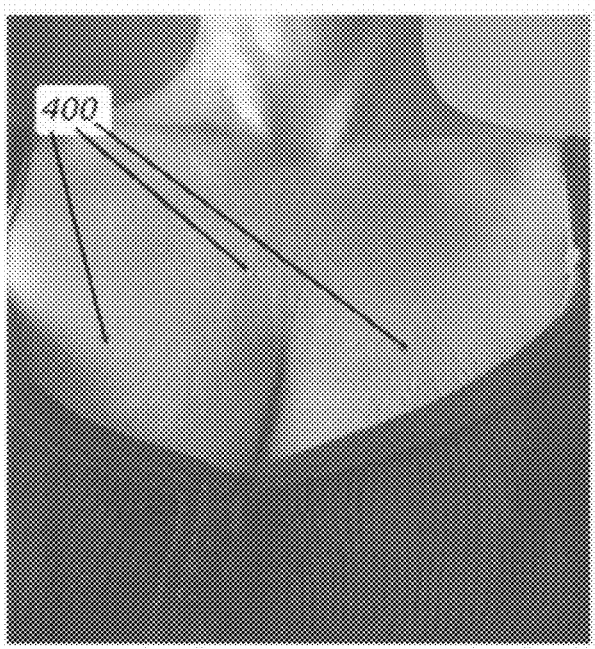
FIG. 4A is an image showing lines associated with the décolleté area of a user before applying the liquid adhesive.
Figure 4B:
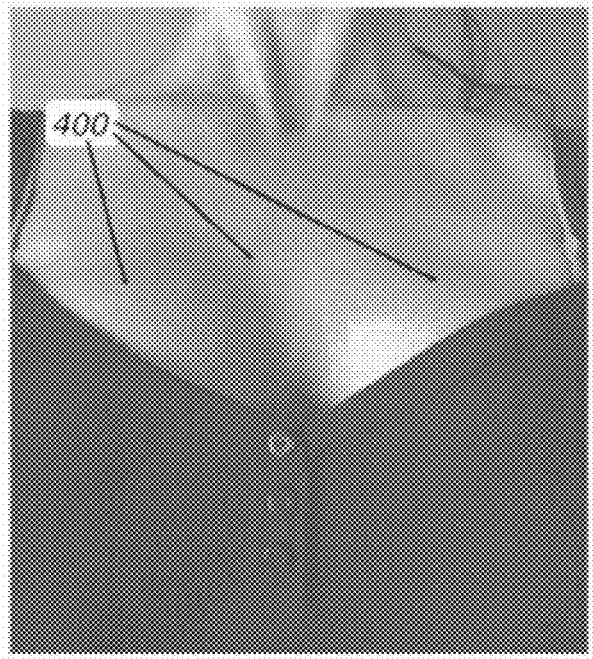
FIG. 4B is an image showing substantial reduction of lines associated with the décolleté area of the user after application of the liquid adhesive.

FIG. 4A is an image showing stretch marks and lines associated with the décolleté area 400 (i.e., including the chest area just above the breasts, as well as the upper portion of each breast) of a user before applying the liquid adhesive. FIG. 4B is an image showing substantial reduction of the stretch marks and lines associated with the décolleté area 402 of the user after application of the liquid adhesive. As discussed above in conjunction with FIG. 3A, the liquid adhesive may be applied in any suitable location (e.g., to an inner side portion of each breast so as to form a bond between the inner side portion of each breast and the article of clothing), and the breasts may be positioned in any suitable manner (e.g., separated) to achieve the desired appearance (i.e., substantial reduction of stretch marks and/or lines in the décolleté area 400). As shown in FIG. 4B, the liquid adhesive may be applied so as to maintain the breasts in a separated position, thus smoothing the skin in the décolleté area 402 and keeping new lines from forming.

Figure 5A:
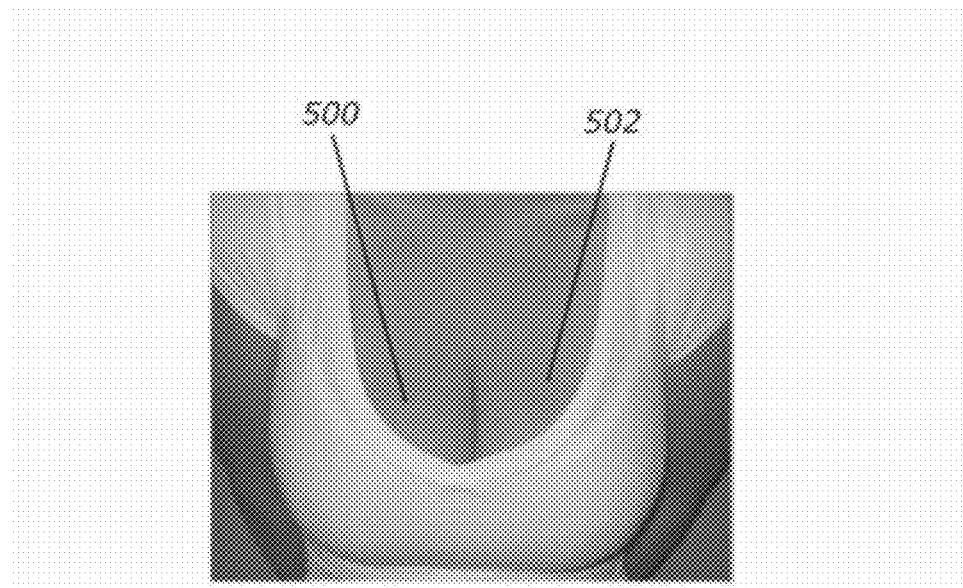
FIG. 5A is an image of the breasts of a user before being lifted to a lifted position.
Figure 5B:
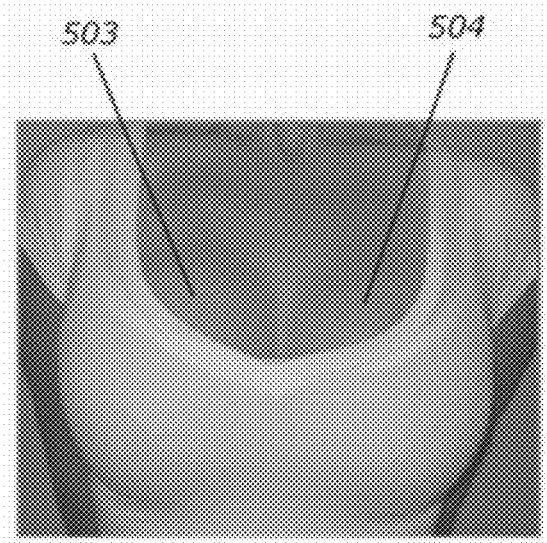
FIG. 5B is an image of the breasts of the user after being lifted to a lifted position and maintained in the lifted position via application of the liquid adhesive.

FIG. 5A is an image of the breasts 500, 502 of a user before being lifted to a lifted position. FIG. 5B is an image of the breasts 503, 504 of the user after being lifted to a lifted position. The lifted breasts 503, 504 may be maintained in the lifted position via application of the liquid adhesive. For example, the liquid adhesive may be applied to any suitable area of each breast 500, 502 and/or to the appropriate inner portion of the article of clothing, and the breasts 500, 502 may be lifted to a lifted position (see breasts 503, 504). As the liquid adhesive dries, a bond may be formed between the lifted breasts 503, 504 and the article of clothing (e.g., a bra), thus maintaining the lifted breasts 503, 504 in the lifted position.

Although the present disclosure describes in detail methods for shaping breast tissue via the application of the liquid adhesive, it will be understood that the liquid adhesive may be utilized for other purposes. For example, single mastectomy patients may utilize the liquid adhesive to achieve a desired appearance associated with the single natural breast and/or to adhere a prosthetic to the skin and/or to adhere a prosthetic bra to the skin.

The foregoing description has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A method for shaping breast tissue of a user within an article of clothing designed to cover at least part of a user's breasts, the method comprising:
    positioning at least a portion of the breast tissue of the user within the article of clothing;
    applying a pressure sensitive, quick drying liquid adhesive to a selected area of a breast tissue of a user; and
    shaping the breast tissue within the article of clothing to achieve a desired appearance by positioning the breast tissue within the article of clothing in a desired position and adhering the breast tissue having the liquid adhesive applied thereto, to the article of clothing by pressing the article of clothing being worn by the user against the breast tissue having the liquid adhesive applied thereto until such time as the breast tissue adheres to the article of clothing to maintain the desired shape of the breast tissue.

2. The method of claim 1, wherein the article of clothing comprises a bra.

3. The method of claim 1, wherein the step of shaping the breast comprises lifting at least one breast to a lifted position and maintaining the at least one breast in the lifted position by adhering the applied liquid adhesive on the breast tissue to the article of clothing.

4. The method of claim 1, wherein the step of shaping the breast comprises separating a first breast from a second breast of the user and causing the first breast to remain separated from the second breast by securing the applied liquid adhesive applied to the breast tissue to the article of clothing in a position where the first breast is maintained separate from the second breast.

5. The method of claim 1, wherein the step of shaping the breast further comprises bringing a first breast into contact with a second breast of the user and causing the first breast to remain in contact with the second breast of the user by securing applied liquid adhesive applied to the first breast to the second breast.

6. The method of claim 1, wherein the liquid adhesive is applied to an outer side area of at least one breast that is initially not contained within the article of clothing.

7. The method of claim 6, wherein the step of shaping the breast comprises placing at least a portion of the outer side area of the at least one breast within the article of clothing so that the portion of the outer side area of the at least one breast is contained within the article of clothing via the liquid adhesive.

8. The method of claim 1, wherein the liquid adhesive is applied to an upper area of at least one breast that is initially not contained within the article of clothing.

9. The method of claim 8, wherein the step of positioning the at least one breast comprises covering at least a portion of the upper area of the breast with the article of clothing so that the portion of the upper area is contained within the article of clothing via the liquid adhesive.

10. The method of claim 1, wherein the liquid adhesive is applied to the breast tissue via an adhesive-containing towlette or roll-on.

11. The method of claim 1, wherein the liquid adhesive comprises a mixture of a polymer and a solvent, and where the mixture has a pH within the range of between about 6 to about 8.

12. The method of claim 11, where the polymer is selected from the group consisting of: a methacrylate copolymer; a polyquaternium cationic polymer, a poly(acrylic acid) polymer; an acrylate copolymer; and combinations of two or more of the foregoing.

13. A method for shaping breast tissue of a user within an article of clothing designed to cover at least part of a user's breasts, the method comprising:
    applying a pressure sensitive, quick drying liquid adhesive to an article of clothing;
    positioning at least a portion of the breast tissue of the user within the article of clothing; and
    shaping the breast tissue within the article of clothing to achieve a desired appearance by positioning the breast tissue within the article of clothing in a desired position and adhering the breast tissue to the article of clothing having the liquid adhesive applied thereto by pressing the article of clothing being worn by the user against the breast tissue until such time as the breast tissue adheres to the article of clothing to maintain the desired appearance.

14. The method of claim 13, wherein the article of clothing comprises a bra.

15. The method of claim 13, wherein the step of shaping the breast comprises lifting at least one breast to a lifted position and maintaining the at least one breast in the lifted position by adhering the applied liquid adhesive on the article of clothing to the breast tissue.

16. The method of claim 13, wherein the step of shaping the breast comprises separating a first breast from a second breast of the user and causing the first breast to remain separated from the second breast by securing the applied liquid adhesive on the article of clothing to the breast tissue at a position where the first breast is maintained separate from the second breast.

17. The method of claim 13, wherein the step of applying a pressure sensitive, quick drying liquid adhesive further includes applying the liquid adhesive on the inside of a first breast and wherein the step of shaping the breast comprises bringing the first breast into contact with a second breast of the user and causing the first breast to remain in contact with the second breast of the user by securing the applied liquid adhesive applied to the first breast to the second breast.

18. The method of claim 13, wherein the step of shaping the first breast comprises placing at least a portion of an outer side area of the breast within the article of clothing and causing the portion of the outer side area of the breast to be maintained within the article of clothing via the applied liquid adhesive.

19. The method of claim 13, wherein the step of shaping the breast comprises positioning at least a portion of an upper area of at least one breast within the article of clothing, and causing the portion of the upper area of at least one breast to be maintained within the article of clothing via the applied liquid adhesive.

20. A liquid adhesive for use in connection with shaping one's breast, the liquid adhesive designed for application directly to the breast tissue of a user and being capable of adhering breast tissue to an article of clothing to shape the breast within the article of clothing, the liquid adhesive being a pressure sensitive, quick drying adhesive that is safe for use on a user's skin, the liquid adhesive comprising a mixture of a polymer and a solvent, where the mixture has a pH within the range of between about 6 to about 8 and where the solvent comprises denatured alcohol and water and where the polymer is selected from the group consisting of: a methacrylate copolymer; a polyquaternium cationic polymer; a poly (acrylic acid) polymer; an acrylate copolymer; and combinations of two or more of the foregoing.

\* \* \* \* \*